United States Patent
Owens et al.

[15] 3,663,299

[45] May 16, 1972

[54] SOLID STATE ELECTRIC CELL HAVING STABILIZED RESISTANCE

[72] Inventors: Boone B. Owens, Calabasas; James E. Oxley, Hollywood, both of Calif.

[73] Assignee: Gould Sonics, Inc.

[22] Filed: Aug. 31, 1970

[21] Appl. No.: 68,325

[52] U.S. Cl. .................................. 136/83 R, 136/153
[51] Int. Cl. ............................... H01m 11/00, H01m 13/00
[58] Field of Search ............... 136/83, 153, 137, 100.6; 23/89, 100, 367; 252/518

[56] References Cited

UNITED STATES PATENTS

| | | | |
|---|---|---|---|
| 2,718,539 | 9/1955 | Bradshaw et al. | 136/83 R |
| 3,443,997 | 5/1969 | Argue et al. | 136/83 R |
| 3,476,605 | 11/1969 | Owens | 136/83 R |
| 3,503,810 | 3/1970 | Groce | 136/120 |

*Primary Examiner*—Anthony Skapars
*Attorney*—Sokolski and Wohlgemuth

[57] ABSTRACT

A solid state electric cell having a mobile oxidant such as iodine in the cathode, a solid state electrolyte and a suitable anode containing a reductant material such as silver which is capable of reducing the mobile oxidant, wherein at least the anode additionally contains a material which is capable of reacting with the primary reaction product of the mobile oxidant and reductant to form a resulting product in situ that has improved ionic conductivity as compared to the primary reaction product.

12 Claims, 2 Drawing Figures

INVENTORS
BOONE B. OWENS
JAMES E. OXLEY
BY
SOKOLSKI & WOHLGEMUTH
ATTORNEYS

INVENTORS
BOONE B. OWENS
JAMES E. OXLEY
BY
SOKOLSKI & WOHLGEMUTH
ATTORNEYS

SOLID STATE ELECTRIC CELL HAVING STABILIZED RESISTANCE

BACKGROUND OF THE INVENTION

The invention herein described was made in the course of or under a contract or subcontract thereunder, with the Department of the Navy.

The herein invention relates to solid state electric cells having improved shelf life through the prevention of resistance build-up in the cell. More particularly, the invention relates to solid state electric cells having mobile oxidants and a method and means for preventing the oxidant from reacting with the anode composition to cause a high resistance layer to be formed on the anode.

Solid state electrochemical devices, particularly solid state electric cells, as well as batteries, are known in the art as shown in U. S. Pat. No. 2,718,539 and Re. 24,408. These solid state cells are of particular interest since they have excellent low temperature performance, have a long shelf life, no electrolyte leakage and susceptibility to miniaturization.

Recently, solid conductive compositions of matter having unusually high ionic conductivity, i.e., at least greater than that of AgI, have been described. For example, in U. S. Pat. No. 3,443,997 there is disclosed a solid electrolyte element having the formula $MAg_4I_5$ where M represents K, Rb, $NH_4$ or Cs and combinations thereof, Cs being present only as a minor constituent of M. Typical examples of these highly conductive electrolytes would include $RbAg_4I_5$, $KAg_4I_5$ and the like. In U. S. Pat. No. 3,476,606 there is disclosed an ionically conductive solid state electrolyte composition which is an organic ammonium silver iodide salt which has a preferred composition range of from $QAg_4I_5(QI.4AgI)$ to $Qag_9I_{10}(QI.9AgI)$ where Q is an organic ammonium cation preferably a quaternary ammonium cation preferably of ionic volume between 30 and 85 cubic angstroms. A typical electrolyte composition formed within this range is $[N(CH_3)_4]_2Ag_{13}I_{15}$.

The cathode in the electric cell consists generally of a non-metal capable of functioning as an electron acceptor, such materials being capable of reduction by any of the electron donors which are used as anodes. Several such cathode materials are disclosed in U. S. Pat. Re. 24,408. Because of its relatively low volatility however, iodine in elemental form or preferably as part of an organic or inorganic complex is favored as a cathode material. Particularly preferred as a source of iodine are organic ammonium polyiodides of the type disclosed in U. S. Pat. No. 3,476,605. These preferred polyiodide compositions thus have a preferred general formula $QI_n$ where Q is an organic ammonium cation of ionic volume between 30 and 85 angstroms preferably a quaternary ammonium cation and $n$ has a value range from two to 24,40811. Typical of such material is tetramethylammonium pentaiodide, $N(CH_3)_4I_5$. It is generally preferred that both the cathode and the anode of the cell are of a composite structure and contain dispersed solid electrolyte material therein together with carbon. Thus a typical cathode will comprise 2 to 80 weight percent polyiodide, 5 to 60 weight percent carbon, and 10 to 50 weight percent electrolyte.

The typical anode in the past comprised a metal such as silver. Preferred, however, is a type of composite anode disclosed in U. S. Pat. No. 3,503,810 which has finely divided silver metal powder in a matrix of carbon and electrolyte.

In the aforegoing electric cells, the electrolyte and cathode are pressed powder pellets. The anode can be plain silver foil, though it is preferably a mixture of silver, electrolyte and carbon, also in pressed pellet form. One of the particular advantages of the preferred electrolytes disclosed above is their high conductivity. Once the resistance of the electrolyte layer increases significantly, the advantage of using the high conductivity material is lost since the discharge voltage becomes too low for most applications. With such increased resistance there then is considerably less useful energy during the time of discharge. It has been found that in the foregoing solid state electric cell system there has been a tendency for the resistance to increase during storage. Further, with an increase in storage temperature the rate of resistance build-up has also gone up.

SUMMARY OF THE INVENTION

The principal object of this invention is to provide a solid state electric cell wherein there is no resistance build-up during storage.

It has been discovered that one mode of resistance build-up in solid state electric cells occurs during storage by a mobile oxidant such as iodine diffusing through the solid state electrolyte to the anode where the oxidant reacts with the reductant present in the anode to form a resultant highly resistant layer on the anode surface, i.e., one which has a resistance greater than that of the solid state electrolyte. In accordance with the present invention, resistance build-up in a solid state cell by formation of a highly resistant primary reaction product of the reductant and oxidant in the anode is prevented by incorporating an additive material in at least the anode to react with the primary reaction product to form a further compound in situ that has significantly better conductivity than the highly resistant primary products. Thus, for example, in a solid state cell which contains iodine as a mobile oxidant in the cathode composition and silver as a reductant in the anode composition, the resulting formed silver iodide on the anode surface reacts with an additive that is dispersed in at least the anode and forms a high-conductivity product. For example, the presence of RbI additive in the anode can result in a combination reaction with the AgI to form the highly conductive $RbAg_4I_5$, a preferred solid electrolyte material having extremely high ionic conductivity.

The use of additives corresponding to any conductive silver iodide solid electrolyte is illustrated as follows. Let $ZX \cdot nAgI$ represent a conductive electrolyte. ZX is dispersed into the anode of a solid state cell. The overall reaction due to iodine diffusion is then

$$nI + nAg + ZX \rightarrow ZX \cdot nAgI$$

forming conductive $ZX \cdot nAgI$ rather than the less conductive AgI. Chemical compatibilities and proper amounts of additives may be readily determined by routine testing. Z may represent at least a single cation or cationic complex and X may represent at least a single anion or anionic complex. Thus ZX may include $RbI$, $Rb_2AgI_3$, $Me_4NI$, $(CH_3)_4NAg_2I_3$, $Ag_3PO_4$, $Ag_4S$.

In a further embodiment of the invention where the solid electrolyte contains dispersed therein a reductant for the mobile oxidant, the electrolyte composition can additionally contain an additive material which will chemically accommodate the reaction product of the reductant in the electrolyte with the mobile oxidant. Through the use of an additive the material will chemically accommodate the reaction product of the reductant and mobile oxidant, and it has been found that the resulting solid state electric cell will experience little or no increase in resistivity over long periods of storage.

DESCRIPTION OF THE PREFERRED EMBODIMENTS

Figure 1:
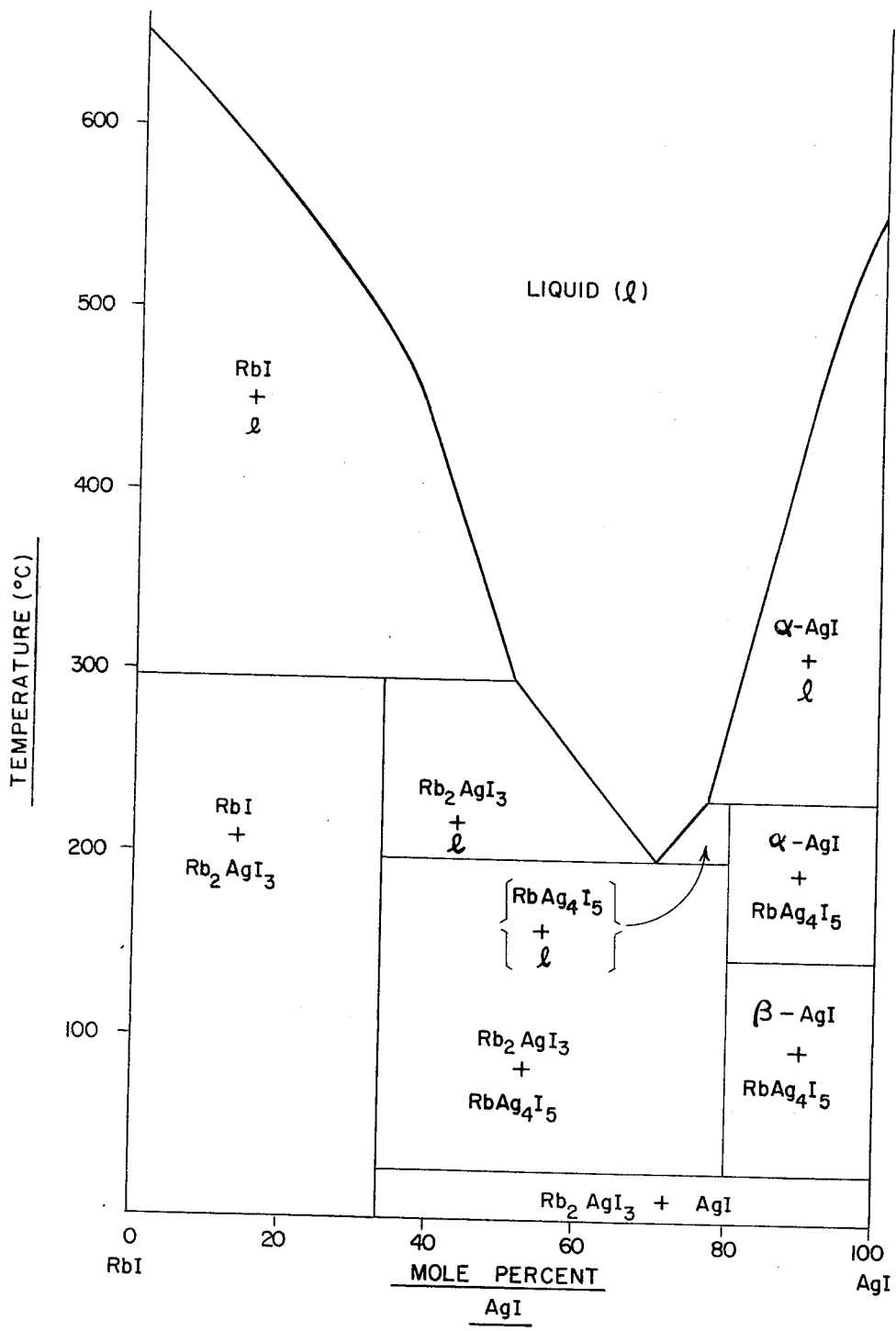

The herein invention is directed to solving a problem that exists in solid state electrochemical devices. In a simplified form, the region within a typical solid state cell wherein the herein problem exists is comprised of an anode which consists of any suitable material that functions as an electron donor. The most typical material used is silver which can be in the form of a thin sheet or foil or powder. Copper and other suitable materials can also be utilized. The preferred form as disclosed in U. S. Pat. No. 3,503,810 is an anode formed of a mixture of finely divided silver powder in a matrix of carbon and a solid electrolyte.

The herein invention is particularly directed to solid state electrochemical devices wherein the solid electrolyte element utilized has unusually high ionic conductivity. Examples of such electrolytes are disclosed in U. S. Pat. No. 3,443,997 wherein the electrolyte has a general formula $MAg_4I_5$ where M represents K, RB, NH$_4$, or Cs. Another example of a particular preferred type of highly conductive electrolyte is disclosed in U. S. Pat. No. 3,476,606 wherein the electrolyte has the formula QAg$_n$I$_{n+1}$ where $n$ can vary from three to 39 and Q is an organic ammonium cation. Examples of other suitable electrolytes include Ag$_3$SI, Ag$_7$I$_4$PO$_4$, Ag$_{19}$I$_{15}$P$_2$O$_7$ and Ag$_5$I$_3$SO$_4$. The herein invention is particularly directed to the foregoing types of electrolytes and other electrolytes which possess unusually high conductivity since the increase of resistance with storage would inherently obviate the advantage of the utilization of these particular electrolytes making them impractical. For example, the particular advantage of the herein invention is thus not as apparent when the solid electrolyte is composed of low conductivity material such as silver iodide and similar types of material.

The cathode of a particular device of this invention will consist generally of a non-metal capable of functioning as an electron acceptor, such materials being capable of reduction by any of the electron donors which are used as anodes. Several suitable cathode materials are shown in Re. 24,408. Because however, of its relatively high reactivity, iodine is a kinetically favored cathode material. Many of the cathode materials, such as those containing iodine, have a mobile oxidant. The iodine can move through the electrolyte composition where it can then strike the surface of the anode reacting with the reductant therein to form a resistive material which will coat the anode increasing the resistivity of the cell. For example, iodine can migrate through the solid electrolyte to form AgI as a coating on the silver containing anode. The AgI is highly resistive as compared to the electrolyte and will noticeably raise the resistance of the cell and severely affect polarization. Other typical mobile oxidants than iodine which can similarly traverse the electrolyte in the cells would include for example, bromine, chlorine, sulfur, or other oxidant materials, in elemental or complexed states, with finite vapor pressures.

The rate of diffusion of the iodine, for example, is related to its partial pressure. The higher the partial pressure the greater the rate of diffusion through the electrolyte. This can be appreciated, because at the anode the partial pressure of the iodine is always zero since it will be in the form of AgI. As a result the iodine will always diffuse through the electrolyte to the anode because of this pressure differential or gradient.

As described in the aforementioned patents relating to the electrolyte composition, it is preferably formed as a pressed powder made up of crystals of the highly conductive single phase solid compounds. The compact electrolyte has a finite permeability to iodine or other similar mobile oxidants. It is believed that the iodine does not permeate a single crystal, but travels along grain boundaries, cracks, crevices, and the like. As a result, if a perfect single crystal electrolyte were used, the problem of diffusion of the mobile oxidant could be essentially eliminated. However, when polycrystalline material is compacted to form the electrolyte, the described problem will exist. A further way of at least minimizing the herein problem is to minimize the diffusion path through the electrolyte. This can be accomplished by better packing of the electrolyte crystals when forming the compacted powder. This, for example, might be achieved by utilizing different size electrolyte grains such as a bi-modal or tri-modal blending of electrolyte crystals.

The herein invention is particularly directed to preventing the build-up of the highly resistive layer on the anode surface. In a copending application entitled Solid State Electric Cell Having Stabilized Resistance by Owens and Humphrey filed of even date and assigned to the same assignee, there is disclosed one method for preventing the formation of the highly resistive layer. The method disclosed in that application is directed to disposing in the electrolyte a material capable of reacting with the mobile oxidant preventing it from reaching the anode. For example, silver is disclosed as being dispersed in the electrolyte such that when the mobile iodine, for example, contacts the silver, dispersed AgI would result throughout the electrolyte leaving a conductive path through the electrolyte and preventing a continuous highly resistive layer of AgI forming on the surface of the anode. The herein invention can be used in combination with that disclosed in that copending application or can serve as another approach for preventing the formation of the continuous resistive layer forming on the anode surface.

Figure 2:
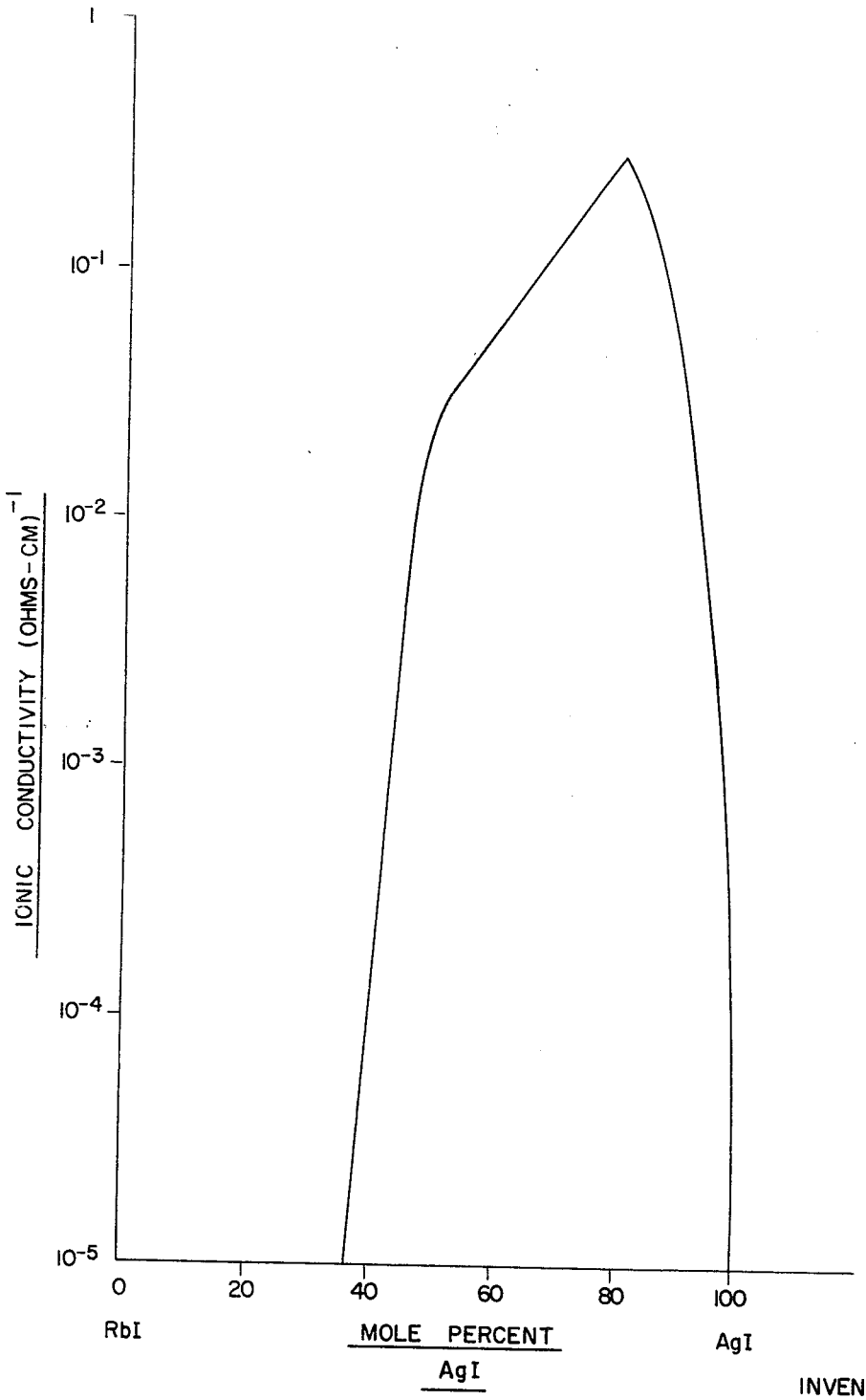

The approach of the present invention is to chemically accommodate the formed reaction product between the mobile oxidant and reductant such as, for example, AgI, by disposing at least in the anode a material that will react with AgI or other formed resistive products to produce a new material as a result of the reaction that has a higher ionic conductivity. Thus in the referred to application filed herewith the highly resistive reaction product such as AgI is allowed to form but is dispersed for example throughout the electrolyte so that a continuous layer is not formed on the anode surface. However, the AgI will remain in that form within the cell. The herein invention allows the AgI to form even on the surface of the anode but has a material present in at least the anode which will react with the AgI upon its formation to produce a much more suitable ionically conductive product. In the most preferred embodiment of the herein invention the additive to the anode is a material which will react with the AgI to produce a solid state electrolyte in situ. This will be explained in more detail with relation to the phase diagram of FIG. 1 and the ionic conductivity diagram of FIG. 2. The phase diagram of FIG. 1 is for the AgI-RbI system and is disclosed and explained in U. S. Pat. No. 3,519,404. As has been previously indicated the preferred most highly conductive material is RbAg$_4$I$_5$. As can be seen from the phase diagram, it is observed that the compound formed at 80 mole percent AgI has a peritectic temperature of 230° C. This compound as well as its potassium and ammonium analogues is the most conductive of any solid ionic material heretofore known having an ionic conductivity at 25° C of 0.26 (ohm-cm)$^{-1}$. This high conductivity is seen in FIG. 2, where the maximum of the conductivity curve appears at the 80 mole percent AgI composition. The referred to patent additionally describes the region of the phase diagram at a temperature below the eutectic temperature and a composition corresponding to 75 mole percent AgI. A mixture of two solid phases is present, Rb$_2$AgI$_3$ plus RbAg$_4$I$_5$ which is empirically equivalent to a single phase compound which would have the molecular formula RbAg$_3$I$_4$. This corresponds to a mixture containing 83 mole percent of the conductivity imparting composition RgAg$_4$I$_5$ and 17 mole percent Rb$_2$AgI$_3$. The eutectic point of the phase diagram however contains a significantly higher percent of the Rb$_2$AgI$_3$. At the eutectic point the amount of Rb$_2$AgI$_3$ is about 31 mole percent, the remaining 69 mole percent being the highly conductive RbAg$_4$I$_5$. The empirical formula for the eutectic if it were a single phase compound would be Rb$_3$Ag$_7$I$_{10}$. The following equation can then be postulated to show the stable phases formed:

It has been found as part of the herein invention that by having an increased amount of Rb$_2$AgI$_3$ present in the electrolyte of the anode, AgI formed therein can be chemically accommodated and will react with the Rb$_2$AgI$_3$ to form the highly conductive RbAg$_4$I$_5$ in accord with the following equation:

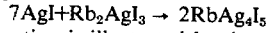

The above equation is illustrated by the phase diagram of FIG. 1 wherein it can be seen that with an increasing amount of AgI present the Rb$_2$AgI$_3$ reacts to form RbAg$_4$I$_5$. In order to effectively achieve the chemical accommodation, the electrolyte composition should contain more than 17 mole percent Rb$_2$AgI$_3$ and preferably in excess of 30 mole percent of Rb$_2$AgI$_3$. Thus, compositions containing up to 75 mole percent Rb$_2$AgI$_3$ and 25 mole percent RbAg$_4$I$_5$ have been found to provide satisfactory electrical cells with concurrent chemical accommodation of the AgI that is formed at the anode thereof. However, even greater amounts of Rb$_2$AgI$_3$, up to 90 mole percent, can provide satisfactory results particularly where the application is limited to low current density. Thus, in one embodiment of the invention the eutectic composition as shown on the phase diagram of FIG. 1 is used as the electrolyte in at least the anode of an electric cell. To simplify the cell construction, the eutectic composition can in fact be utilized as the electrolyte throughout the cell. The eutectic is particularly desirable since it is readily formed and does not comprise separately mixing the individual components $Rb_2AgI_3$ and $RbAg_4I_5$. The same results are obtainable wherein either K or $NH_4$ replaces Rb. As indicated in the aforementioned patent, the conductivity imparting component of the preferred electrolyte disclosed therein is $MAg_4I_5$ where M is selected from a class consisting of K, Rb, $NH_4$, Cs, and combinations thereof, Cs being present only as a minor constituent of M. In an article entitled Solids With High Ionic Conductivity In Group I Halide Systems by J. N. Bradley and P. D. Greene in Transactions of The Faraday Society, No. 530, Vol. 63, Part 2, Feb. 1967, pages 424–430, there are shown the various phase diagrams for AgI and MI systems. It can be seen that the phase diagrams are all quite similar and thus the eutectic composition of each of these compounds would provide suitable electrolytes for anodes. For example, the compounds $K_2AgI_3$ will behave in the same way as mentioned above in regards to $Rb_2AgI_3$ when present in the electrolyte and will react with the AgI to provide the highly conductive $KAg_4I_5$. The comparable compound for $NH_4$ is $(NH_4)_2AgI_3$. Thus, in a first preferred embodiment of this invention at least the electrolyte composition of an anode will contain above 17 and preferably from 30 to 75 mole percent of a compound having a formula $M_2AgI_3$ where M is selected from the class consisting of K, Rb, $NH_4$, Cs, and combinations thereof Cs being present only as a minor constituent of M.

As indicated, the eutectic compositions are most suitable since they are readily obtainable. However, it should be appreciated that for example the electrolyte composition in the anode can comprise $RbAg_4I_5$ containing $K_2AgI_3$ as the additive to accommodate the AgI. The product of the reaction with the AgI would be a mixed electrolyte containing the $RbAg_4I_5$ and $KAg_4I_5$, both of which are highly ionically conductive, as either a solid solution or as distinct phases. Of course any of the foregoing listed materials can be present in various other solid state electrolytes such as previously described to accommodate reaction products and are not merely limited to the specific electrolyte compositions having the formula $MAg_4I_5$.

In addition to the foregoing, it should be appreciated that MI alone can be added to an electrolyte composition to chemically accommodate the undesirable highly resistive reaction product. For example, as can be seen from the phase diagram of FIG. 1 if RbI is added to the electrolyte, when it encounters AgI it will initially form $Rb_2AgI_3$ which in turn, as indicated above will react with further AgI to produce the desired electrolyte $RbAg_4I_5$. Since a two-step process is required to reach the desired electrolyte, it is apparent that it is preferable to utilize the intermediate $Rb_2AgI_3$ or more generally, $M_2AgI_3$. However, it should be established that as an embodiment of this invention the electrolyte of the anode can contain at least 5 to 75 mole percent of MI. The optimum amount may readily be calculated for a given anode composition, and will vary for different blends.

As mentioned above, U. S. Pat. No. 3,476,606 discloses electrolytes having the formula $QAg_nI_{n+1}$. As explained in that patent, the electrolyte is a result of a reaction between QI and AgI. The conductive materials are found where $n$ varies from three to 39. As can be seen from Table 1 of the patent, there exist various compositions wherein the QI is the same but $n$ will vary. The conductivity at $n=6$ and 8 is higher being at 0.03 $(ohm-cm)^{-1}$ than for $n=4$ where the conductivity is 0.01 $(ohm-cm)^{-1}$. Thus, in accord with the present invention the composition where $n=4$ could be an additive, since by further addition or reaction with AgI a more conductive material namely at either $n$ values of six or eight will result. It is to be pointed out that the phase diagrams for the QI systems are not well established as with the MI-AgI systems as for example shown in FIG. 1. However, an analogy can be drawn between the QI system and the MI system. With the addition of AgI to QI, various stable phases of resulting products can exist at different ratios of AgI to the QI. As pointed out in the aforementioned patent, a stable compound $N(CH_3)_4Ag_2I_3$ will exist at $n=2$. This material, however, is essentially non-conductive similar to the compound $Rb_2AgI_3$ as seen in FIG. 1. However, further addition of AgI to the material will increase the value of $n$ to a level up to four, six, eight and the like whereby the conductivity of the resulting electrolyte will be significantly increased. Thus in the broader sense either QI can serve as an additive in the herein invention or the additive can comprise a stable product of QI and AgI which is $QAg_mI_{m+1}$ where $m$ caries from one to 10 which can further react with the mobile oxidant to form a more highly conductive compound.

The value of adding a material such as QI or the related stable compounds of relatively low conductivity mentioned above resulting from the reaction of QI with AgI is its behavior at temperatures below 27° C. As can be seen in FIG. 1, below 27° C the highly conductive material $RbAg_4I_5$ does not form. As indicated, the AgI will not react with the $Rb_2AgI_3$. Thus where the solid state electric cell is to be stored or kept continuously at temperatures significantly below 27° C the phase diagram of FIG. 1 indicates that the desired reaction to form the highly conductive $RbAg_4I_5$ will not result. It might be pointed out, however, that where a cycling of temperature occurs, where a cell, for example, was stored at a temperature below 27° C that was intermittently exposed to a temperature above that level the reaction to form the $RbAg_4I_5$ would immediately proceed and the desired result of the invention would occur. However, members of the QI system discussed above do not encounter such a temperature limitation and thus they are suitable for utilization where the cell will encounter storage conditions below 27° C. Generally, in a solid state cell utilizing as an electrolyte the material disclosed in U.S. Pat. No. 3,476,606, the QI type of additive would be utilized in the anode. However, the additive does not have to be a member of the electrolyte system. In cells utilizing as an electrolyte the $MAg_4I_5$ material, the additive could for example comprise the QI type materials, where the QI or $QAg_nI_{n+1}$ is used to overcome the 27° C temperature limitation noted with the RbI system. It is noted that this low temperature limitation also exists in the AgI phase diagram with $NH_4I$ and KI, at 32° C and 36° C, respectively.

In addition to the foregoing types of materials that can be added to the electrolyte in at least the anode of the solid state electric cell, any additional compounds that will combine with the product of the reaction of the mobile oxidant with the reductant in the anode to form a highly conductive compound can be used. The additive of course should be stable and compatible with the electrolyte composition. Examples of further materials can include $Ag_2S$, $Ag_3PO_4$, $Ag_2SO_4$, and $Ag_4P_2O_7$.

As has been indicated above, the additive should be present in at least the electrolyte portion of the anode of the solid state cell where the degradation reaction occurs. The amount of the additive material to be used is determined based upon the configuration and composition of a given cell and must be ultimately determined by a trial and error procedure which is simple and straightforward. Two approaches can be utilized. One can determine for a given cell what the rate of the mobile oxidant diffusion is over a given time period. This can be determined by use of a diffusion limited electrochemical cell. One can then calculate the amount of additive required to accommodate that amount of iodine diffusion and place that amount of additive in the anode by mixing it with the powders comprising the anode and pressing it into a pellet. Another approach involves adding varying amounts of the additive to the anode composition and testing the cells over the desired time period to determine the minimum amount of additive material required to prevent a resistance build-up in the cell over the stored time period. For example it has been found that for most cells utilizing $RbAg_4I_5$ as an electrolyte as has been indicated, there should be more than 17 mole percent of the additive present in the electrolyte mixture and preferably from 30 to 75 mole percent of the additive such as $Rb_2AgI_3$.

The electric cell can further incorporate a getter material, at least in the electrolyte layer, as disclosed in the aforementioned copending application filed concurrent herewith. A typical getter is silver, which will tie up the mobile oxidant in the electrolyte composition prior to it reaching the surface of the anode. In this instance, it may also be desirable that an additive of the herein invention also be incorporated in the electrolyte layer so as to chemically accommodate the reaction product of the getter and the mobile oxidant. As disclosed in the copending application the reaction in the electrolyte layer of the cell can be essentially the same type of reaction that will occur on the surface of the anode to form the continuous highly resistive layer. However, by dispersing a reductant such as silver or the like throughout the electrolyte layer the formation of the AgI in a dispersed form throughout the electrolyte does not significantly interfere with the overall resistance of the cell since free conductive paths remain through the electrolyte between the cathode and the anode.

AgI formed and dispersed throughout the electrolyte is still a resistive material and thus it would be preferable to chemically accommodate it within the electrolyte in the same manner that this type of product is accommodated in the anode utilized in the concept of the herein invention. As a result, in another embodiment of this invention where a getter which is a reductant for the mobile oxidant is disposed in the electrolyte layer, the solid state cell can additionally contain an additive of the type disclosed herein. To take further precaution against a resistance build-up, the anode still should contain the additive of this invention even if the electrolyte layer contains a dispersed reductant and the additive of the invention. Once again, the amount of the additive to be disposed within the electrolyte layer can be determined by trial and error to determine the amount necessary to chemically accommodate the AgI formed. Of course it is not as critical that all the AgI formed in the electrolyte be chemically accommodated since it has been demonstrated that relatively successful cell performance will result without any chemical accommodation of a material such as AgI dispersed throughout the electrolyte.

In one preferred embodiment of this invention it has been demonstrated that a eutectic mixture of $Rb_2AgI_3$ and $RbAg_4I_5$ can be used as a total replacement for the electrolyte in both the anode and the electrolyte layer of the cell. Further, the same eutectic may even be used as the electrolyte in the cathode for ease of manufacture. It was found that, as will be indicated in the specific examples, the resistance build-up was prevented. By utilizing such a eutectic composition throughout one is in effect adding the material $Rb_2AgI_3$ to the electrolyte $RbAg_4I_5$. It is believed that the invention will be further understood from the following specific examples:

EXAMPLE 1

Preparation of Reference Cell

A reference cell not incorporating the concept of the herein invention was prepared having an anode comprised in weight percent, 53 percent silver, 42 percent $RbAg_4I_5$ and 5 percent carbon. The anode had a diameter of about 0.3 inch and a thickness of 20 mil. The total cell diameter was about 0.4 inch. The electrolyte layer was comprised in weight percent, 90 percent $RbAg_4I_5$ and 10 percent of a thermoplastic polycarbonate resin produced from the reaction of bisphenol A phosgene. The electrolyte pellet was formed by mixing the resin with the $RbAg_4I_5$ and pressing the mixed powder at a load of 1,000 lbs. to achieve the pellet. The resin served as a filler which aids in the processing and to occupy some of the area of the cracks and crevices between the grain boundaries of the $RbAg_4I_5$. The cathode is comprised, in weight percent, of 77 percent $(CH_3)_4NIB9$, 10 percent carbon and 13 percent $RbAg_4I_5$. The assembly was then pelletized at 10,000 lbs. and encapsulated in an epoxy type resin to give both a cell of rugged construction and one that is protected from atmospheric corrosion. The cell construction is essentially that shown in FIG. 1. When a cell of the above composition and construction was tested at 70° F, it was found to have an initial resistance of 5.4 ohms; after one year had elapsed at the foregoing temperature the resistance of the cell increased to 8.7 ohms. At 160° F a cell of the aforegoing construction had an initial resistance of 4.4 ohms which increased to 10.9 ohms at the end of 1 year.

EXAMPLE 2

RbI-AgI Eutectic Anode Cell

The cell of EXAMPLE 1 was made utilizing the process set forth therein. However the electrolyte in the anode was replaced with a eutectic composition according to the eutectic composition of FIG. 1 containing a mixture of $Rb_2AgI_3$ and $RbAg_4I_5$. This anode was about 0.012 in. thick. Disposed between this anode and the electrolyte was an additional layer of the eutectic composition alone. This layer was 0.008 in. thick, and was pressed onto the anode pellet to form a bilayer, 0.300 in. diameter pellet. A separate layer was introduced in the form of the eutectic composition in addition to the electrolyte layer to determine if there was an advantage in separating the anode containing the eutectic composition from a normal electrolyte by such an intermediate layer of the eutectic alone. As will be shown from the following example, this is not required in order to get successful results. The initial cell resistance at 70° F was 6.6 ohms. At 160° F the initial resistance was 4.6 ohms. At the end of a year the initial resistance at 70° F was 7.1 ohms, and at 160° F was 5.3 ohms. The above results indicate that there was no significant increase in the resistance in the cell over a 1 year period at the two temperatures. Further, when the cells were discharged at −40° F, at the end of 1 year no excess polarization due to storage was noted.

EXAMPLE 3

RbI-AgI Eutectic Anode and Electrolyte Cell

A cell in accord with Example 2 was made wherein the electrolyte composition of the anode was substituted with a eutectic composition of RbI and AgI as indicated in FIG. 1. Additionally, the electrolyte layer was replaced with the eutectic composition. This cell had an initial resistance at 70° F of 6.3 ohm which had risen slightly to 6.8 ohms at the end of 1 year. At 160° F, the cell had an initial resistance of 4.2 ohms which had in fact decreased to 4.1 ohms at the end of 1 year.

EXAMPLE 4

$Rb_2AgI_3$ Additive Cell

The cell of this example is essentially the same as the cell in Example 2 and has an intermediate layer between the anode and the electrolyte layer. However, in this example, the electrolyte of the anode was replaced by a composition having the empirical composition of 50 mole percent RbI and 50 mole percent AgI which corresponds to 75 mole percent $Rb_2AgI_3$ and 25 mole percent $RbAg_4I_5$, as seen in the phase diagram. Additionally, the layer between the anode and the cathode was comprised of this same composition of RbI and AgI. The 50 mole percent AgI in RbI electrolytes was prepared by melting together the AgI and RbI, quenching the product, and then annealing in the solid state at 165° C, to bring this mixture to an equilibrium mixture of $Rb_2AgI_3$ plus $RbAg_4I_5$. Anode and cell fabrication were the same as for Example 2. As can be appreciated, the resulting composition as can be seen from the phase diagram of FIG. 1 contains a higher proportion of $Rb_2AgI_3$ than in the above cell. The resulting cell of this example had an initial resistance of 9.5 ohms at 70° C which slightly increased to 9.8 ohms at the end of 1 year. At 160° F the cell had an initial resistance of 7.1 ohms which increased to 7.4 ohms at the end of the year.

EXAMPLE 5

KI Solid Solution In RbI-AgI Eutectic Anode and Electrolyte Cell

In this example a cell similar in construction to that of Example 2 was formulated. However, the electrolyte composition in both the anode and in the electrolyte layer as well as the intermediate layer between the electrolyte layer and anode, was comprised of a solid solution of potassium and rubidium iodide in silver iodide. The electrolyte was formulated by combining 71.5 mole percent AgI, 7.1 mole percent RbI and 21.4 mole percent KI to form a eutectic mixture containing the two phases $M_2AgI_3$ and $MAg_4I_5$ wherein M is 25 atomic percent Rb and 75 atomic percent K. This electrolyte was used to prepare an anode in accordance with Example 2. This solid solution was investigated to determine a rate effect in the AgI accommodation reaction due to the smaller $K^+$ ion replacing the $Rb^+$ ion. The resulting cell had an initial resistance of 70° F of 7.1 ohms which decreased at the end of 1 year to 6.4 ohms. At 160° F the initial resistance of the cell was 4.0 ohms which slightly increased to 4.3 ohms at the end of a year.

EXAMPLE 6

$(CH_3)_4NAg_2I_3$ Additive Cell

In this example a cell was constructed having the type of layers mentioned in Example 2. The anode contained the electrolyte set forth in the cell in Example 1 having added thereto 10 weight percent $(CH_3)_4NAg_2I_3$. An intermediate layer between the electrolyte layer and the anode was utilized in the cell as was described in the cell in Example 2. This layer contained electrolyte plus 30 weight percent $(CH_3)_4NAg_2I_3$. The electrolyte layer and cathode were identical to those of Example 2. The $(CH_3)_4NAg_2I_3$ was incorporated into the indicated anode and intermediate electrolyte layers by direct addition with mixing by grinding the powders together. This cell had an initial resistance at 70° F of 7.2 ohms which increased to 8.4 ohms at the end of 1 year. At 160° F the cell had an initial resistance of 6.4 ohms which increased to 10.8 ohms at the end of a year. Although the cell increased somewhat in resistance during storage, it was found by X-ray analysis that the very resistive silver iodide had been chemically accommodated and the cell discharged satisfactorily. Thus, whereas AgI was formed in the anode of Example 1 during storage, none was formed in Example 6.

EXAMPLE 7

KI Additive Cell

A set of cells similar to Example 6 was constructed. The anode however contained 10 weight percent KI and the intermediate layer between the electrolyte layer and the anode contained 30 weight percent KI. The cell was made in the same manner as described with regard to Example 6 above. The cell had an initial resistance at 70° F of 6.2 ohms which increased to only 6.5 ohms at the end of 1 year. At 160° F the initial resistance of the cell was 4.1 ohms which increased to 6.0 ohms at the end of the year's test.

Example 8

Combined $Rb_2AgI_3$ Additive

Plus Silver Getter

A cell in accord with Example 3 was made wherein the electrolyte layer had dispersed throughout 7 weight percent of silver as an iodine getter. The silver was added by an oxalate decomposition technique, as described in Example 2 of copending application by Owens and Humphrey filed of even date herein. Thus, in this cell resistance build-up is being prevented by two different mechanisms. In the electrolyte layer, mobile iodine is stopped by the silver getter and, at temperatures above 27° C, reacts with the $Rb_2AgI_3$ to form $RbAg_4I_5$ according to the net reaction.

$$7 Ag + 7 I + Rb_2AgI_3 \rightarrow 2 Rb Ag_4I_5.$$

At temperatures below 27° C the iodine is stopped by the Ag, $$Ag + I \rightarrow AgI$$

to form dispersed AgI which still prevents resistance build-up. After all of the silver getter is consumed, a process that will take several months at 70° C and several years at 20° C, the iodine will react with the silver and $Rb_2AgI_3$ in the anode to form $RbAg_4I_5$ at temperatures above 27° C to further prevent resistance build-up as accomplished in Example 3. The initial resistance of cells of this Example were 3.2 ohms, 5.0 ohms and 10.0 ohms at 160° F, 75° F and −5° F, respectively. After 15 weeks of storage at the indicated temperatures the respective resistances were 3.0 ohms, 4.5 ohms and 8.3 ohms. These cells had an initial capacity, limited by the anode, of 41 nA-hr. After 3 months of storage at 160° F there was no loss in cell capacity, demonstrating that the iodine was being accommodated in the electrolyte layer, and has not yet reached the anode.

We claim:

1. In a solid state electric cell comprising a cathode containing a mobile oxidant, an anode containing a reductant for said oxidant and a solid electrolyte disposed therebetween in cooperative relation, the improvement which comprises:
   means for preventing a continuous layer of a primary reaction product of the mobile oxidant and reductant forming on the anode; said means comprising an additive material disposed in at least the anode which reacts with said primary reaction product forming a resulting product having improved ionic conductivity as compared to the primary reaction product.

2. The cell of claim 1 wherein said anode comprises said reductant dispersed in a solid electrolyte having high ionic conductivity.

3. The cell of claim 2 wherein:
   the additive material will react with the primary reaction product of the oxidant and reductant to form a product which is the same as the electrolyte present in the anode.

4. The cell of claim 2 wherein the additive material is selected from the group consisting of MI and $M_2AgI_3$ and mixtures thereof where M is selected from the class consisting of K, Rb, $NH_4$, Cs and combinations thereof.

5. The cell of claim 4 wherein:
   the electrolyte in said anode is $MAg_4I_5$ containing at least 17 mole percent $M_2AgI_3$.

6. The cell of claim 4 wherein:
   the electrolyte in said anode is $MAg_4I_5$ containing up to 75 mole percent $M_2AgI_3$.

7. The cell of claim 4 wherein:
   the electrolyte in said anode is $MAg_4I_5$ containing from 30 to 75 mole $M_2AgI_3$.

8. The cell of claim 2 wherein:
   the additive material is $QAg_mI_{m+1}$ where Q is an organic ammonium cation having an ionic volume between 30 and 85 angstroms and $m$ varies from one to 10.

9. The cell of claim 8 wherein:
   the additive comprises $QAg_2I_3$.

10. The cell of claim 1 wherein:
    the mobile oxidant is iodine and the reductant is silver such that the primary reaction product formed is AgI.

11. The cell of claim 10 wherein:
    the additive has the general formula ZX where Z represents at least a single cation or cationic complex and X represents at least a single anion or anionic complex.

12. The cell of claim 1 wherein:
    the additive is present in both anode and electrolyte layer.

* * * * *